(12) United States Patent
Châtelain et al.

(10) Patent No.: US 9,628,189 B2
(45) Date of Patent: Apr. 18, 2017

(54) SYSTEM OPTIMIZATION OF PULSE SHAPING FILTERS IN FIBER OPTIC NETWORKS

(71) Applicant: Ciena Corporation, Hanover, MD (US)

(72) Inventors: Benoît Châtelain, Rosemère (CA); Priyanth Mehta, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 14/745,998

(22) Filed: Jun. 22, 2015

(65) Prior Publication Data

US 2016/0277118 A1 Sep. 22, 2016

Related U.S. Application Data

(60) Provisional application No. 62/135,924, filed on Mar. 20, 2015.

(51) Int. Cl.
| | |
|---|---|
| H04B 10/69 | (2013.01) |
| H04B 10/508 | (2013.01) |
| H04L 25/03 | (2006.01) |
| H04B 10/079 | (2013.01) |
| H04B 10/2507 | (2013.01) |

(52) U.S. Cl.
CPC ..... *H04B 10/508* (2013.01); *H04B 10/07953* (2013.01); *H04B 10/25073* (2013.01); *H04L 25/0384* (2013.01)

(58) Field of Classification Search
CPC .......... H04B 10/6971; H04B 10/6973
See application file for complete search history.

(56) References Cited

U.S. PATENT DOCUMENTS

| | | | |
|---|---|---|---|
| 8,897,387 B1 | 11/2014 | Eliaz | |
| 8,908,745 B2 | 12/2014 | Pelekhaty et al. | |
| 2006/0233047 A1* | 10/2006 | Zeroug | G01V 1/44 367/25 |
| 2008/0292026 A1* | 11/2008 | Preisach | H04L 7/0054 375/340 |
| 2011/0052188 A1* | 3/2011 | Feldman | H04B 10/27 398/34 |
| 2013/0266078 A1* | 10/2013 | Deligiannis | H04N 19/00533 375/240.25 |
| 2014/0233964 A1 | 8/2014 | Chien et al. | |

(Continued)

OTHER PUBLICATIONS

Benoît Châtelain et al., "SPM-Tolerant Pulse Shaping for 40- and 100-Gb/s Dual-Polarization QPSK Systems," IEEE Photonics Technology Letters, vol. 22, No. 22, Nov. 15, 2010.

(Continued)

*Primary Examiner* — Shi K Li
(74) *Attorney, Agent, or Firm* — Clements Bernard Walker PLLC; Christopher L. Bernard; Lawrence A. Baratta, Jr.

(57) ABSTRACT

Optimization systems and methods are described configured to optimize filter coefficients in pulse shaping filters in transmitters and matched filters in receivers to maximize Q-factor in a fiber optic system. The systems and methods include receiving a measured Q-factor for one or more channels; iteratively adjusting filter coefficients of the pulse shaping filters and the matched filters to maximize a measured Q-factor of a channel of the one or more channels; and setting the filter coefficients of the pulse shaping filters and the matched filters to optimized values based on the iteratively adjusting.

20 Claims, 14 Drawing Sheets

(56) References Cited

U.S. PATENT DOCUMENTS

| | | |
|---|---|---|
| 2015/0037034 A1 | 2/2015 | Renaudier et al. |
| 2016/0020857 A1* | 1/2016 | Jia .................... H04L 25/03019 |
| | | 398/208 |
| 2016/0105297 A1* | 4/2016 | Yaman .............. H04L 25/03859 |
| | | 398/159 |

OTHER PUBLICATIONS

Benoît Châtelain et al., "Optimized Pulse Shaping for Intra-channel Nonlinearities Mitigation in a 10 Gbaud Dual-Polarization 16-QAM System," Jan. 2011 DOI: 10.1364/OFC.2011.OWO5 http://www.researchgate.net/publication/252007250.

Tommaso Foggi et al., "Spectral Efficiency Optimization in Flexi-Grid Long-Haul Optical Systems," Journal of Lightwave Technology (Impact Factor: 2.86). Nov. 2014; 33(13).

Qunbi Zhuge et al., "Linewidth-Tolerant Low Complexity Pilot-Aided Carrier Phase Recovery for M-QAM using Superscalar Parallelization," Optical Fiber Communication Conference OSA Technical Digest (Optical Society of America, 2012), paper OTu2G.2 •doi:10.1364/OFC.2012.OTu2G.2.

Qunbi Zhuge et al., "Comparison of Intra-Channel Nonlinearity Tolerance between Reduced-Guard-Interval CO-OFDM Systems and Nyquist Single Carrier Systems," Optical Fiber Communication Conference OSA Technical Digest (Optical Society of America, 2012), paper OFC.2012.OTh1B.3.

Xian Xu et al., "Decision Directed Least Radius Distance Algorithm for Blind Equalization in a Dual-polarization 16-QAM System,"Optical Fiber Communication Conference OSA Technical Digest (Optical Society of America, 2012), paper OM2H.5.

Benoît Châtelain et al., "A family of Nyquist pulses for coherent optical communications," OSA Apr. 9, 2012 / vol. 20, No. 8 / Optics Express 8398.

* cited by examiner

SYSTEM OPTIMIZATION OF PULSE SHAPING FILTERS IN FIBER OPTIC NETWORKS

CROSS-REFERENCE TO RELATED APPLICATION(S)

The present patent/application claims priority to U.S. Provisional Patent Application No. 62/135,924 filed on Mar. 20, 2015 and entitled "SYSTEM OPTIMIZATION OF PULSE SHAPING FILTERS IN FIBER OPTIC NETWORKS," the contents of which are incorporated by reference herein.

FIELD OF THE DISCLOSURE

The present disclosure relates to communications systems and methods. More particularly, the present disclosure relates to a system optimization of pulse shaping filters in optical networks, such as for Dense Wave Division Multiplexing (DWDM) applications including super-Nyquist channel spacing, flexible grid channel spacing, fixed grid channel spacing, etc.

BACKGROUND OF THE DISCLOSURE

Pulse shape optimization has been suggested and developed for wireless and optical communication systems. However, conventionally, pulses are optimized according to metrics derived from a pulse's characteristics and each pulse shape was optimized for a specific objective such as, for example, tolerance to jitter, reduction of peak-to-average power ratio, energy maximization in high frequencies, improved tolerance to impulse truncation, etc. In fiber optic networks, pulse shaping is performed through filters at a transmitter and a corresponding receiver. Conventionally, optimization of the pulse shaping is done either theoretically (based on calculations) or based on an offline optimization procedure to minimize Intersymbol Interference (ISI) at the sampling phase of a receiver. Disadvantageously, these approaches do not take into account system impairments, such as finite quantification, filtering effects, the interaction between submodules, etc. Accordingly, conventional optimization approaches do not result in an optimal filter shape for an optical modem under different distortion conditions. Furthermore, conventional optimization approaches do not consider the fact that DWDM channels experience both intra- and inter-channel distortions. Therefore, obtained optimized pulse shapes, with conventional optimization approaches, do not result in a global optimal solution. Also, conventional optimization approaches have not been implemented as part of a working, multi-channel, end-to-end optical communication system.

BRIEF SUMMARY OF THE DISCLOSURE

In an exemplary embodiment, an optimization method configured to optimize filter coefficients in pulse shaping filters in transmitters and matched filters in receivers is described to maximize a Q-factor of a channel of one or more channels in a fiber optic system. The optimization method includes iteratively adjusting filter coefficients of the pulse shaping filters and the matched filters to maximize a measured Q-factor of the channel; and setting the filter coefficients of the pulse shaping filters and the matched filters to optimized values based on the iteratively adjusting. The iteratively adjusting can be performed while the fiber optic system is in-service. The iteratively adjusting can include: determining updated values for the filter coefficients; causing update of the filter coefficients to the updated values; receiving an updated measured Q-factor for the one or more channels based on the updated filter coefficients; and continuing the determining, the causing, and the receiving the updated measured Q until the filter coefficients are determined to represent the optimized values. The optimized values can be determined when one of Kuhn-Tucker conditions are met and a maximum number of iterations is reached. The iteratively adjusting can utilize an objective function defined as maximize$[\min[Q_1 Q_2 \ldots Q_N]]$ wherein $Q_n$ is the measured Q-factor for channel n, and N is a number of channels. The iteratively adjusting can utilize a Sequential Quadratic Programming (SQP) algorithm. The one or more channels can include at least two channels with super-Nyquist channel spacing between them.

In another exemplary embodiment, an apparatus configured to optimize filter coefficients in pulse shaping filters in transmitters and matched filters in receivers is described to maximize a Q-factor of a channel of one or more channels in a fiber optic system. The apparatus includes a processor; and memory storing instructions that, when executed, cause the processor to iteratively adjust filter coefficients of the pulse shaping filters and the matched filters to maximize a measured Q-factor of the channel, and cause setting of the filter coefficients of the pulse shaping filters and the matched filters to optimized values based on the adjustment. The filter coefficients can be adjusted while the fiber optic system is in-service. The iteratively adjust can include the memory storing instructions that, when executed, further cause the processor to determine updated values for the filter coefficients, cause update of the filter coefficients to the updated values, receive an updated measured Q-factor for the one or more channels based on the updated filter coefficients, and continue the determine, the cause, and the receive the updated measured Q until the filter coefficients are determined to represent the optimized values. The optimized values can be determined when one of Kuhn-Tucker conditions are met and a maximum number of iterations is reached. The apparatus can utilize an objective function defined as maximize$[\min[Q_1 Q_2 \ldots Q_N]]$ wherein $Q_n$ is the measured Q-factor for channel n, and N is a number of channels. The apparatus can utilize a Sequential Quadratic Programming (SQP) algorithm. The one or more channels can include at least two channels with super-Nyquist channel spacing between them.

In a further exemplary embodiment, a fiber optic system includes one or more transmitters each including a pulse shaping filter; one or more receivers each configured to communicate with a respective transmitter of the one or more receivers and each including a matched filter; and an optimization engine configured to iteratively adjust filter coefficients of the pulse shaping filters and the matched filters to maximize a measured Q-factor of a channel of one or more channels, and cause setting of the filter coefficients of the pulse shaping filters and the matched filters to optimized values based on the iterative adjustment. The filter coefficients can be adjusted while the fiber optic system is in-service. To perform the iteratively adjust, the optimization engine is configured to determine updated values for the filter coefficients, cause update of the filter coefficients to the updated values, receive an updated measured Q-factor for the one or more channels based on the updated filter coefficients, and continue the determine, the cause, and the receive the updated measured Q until the filter coefficients are determined to represent the optimized values. The optimized values can be determined when one of Kuhn-Tucker conditions are met and a maximum number of iterations is reached. The optimization engine can utilize an objective function defined as maximize[min[$Q_1 Q_2 \ldots Q_N$]] wherein $Q_n$ is the measured Q-factor for channel n, and N is a number of channels. The one or more channels can include at least two channels with super-Nyquist channel spacing between them.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
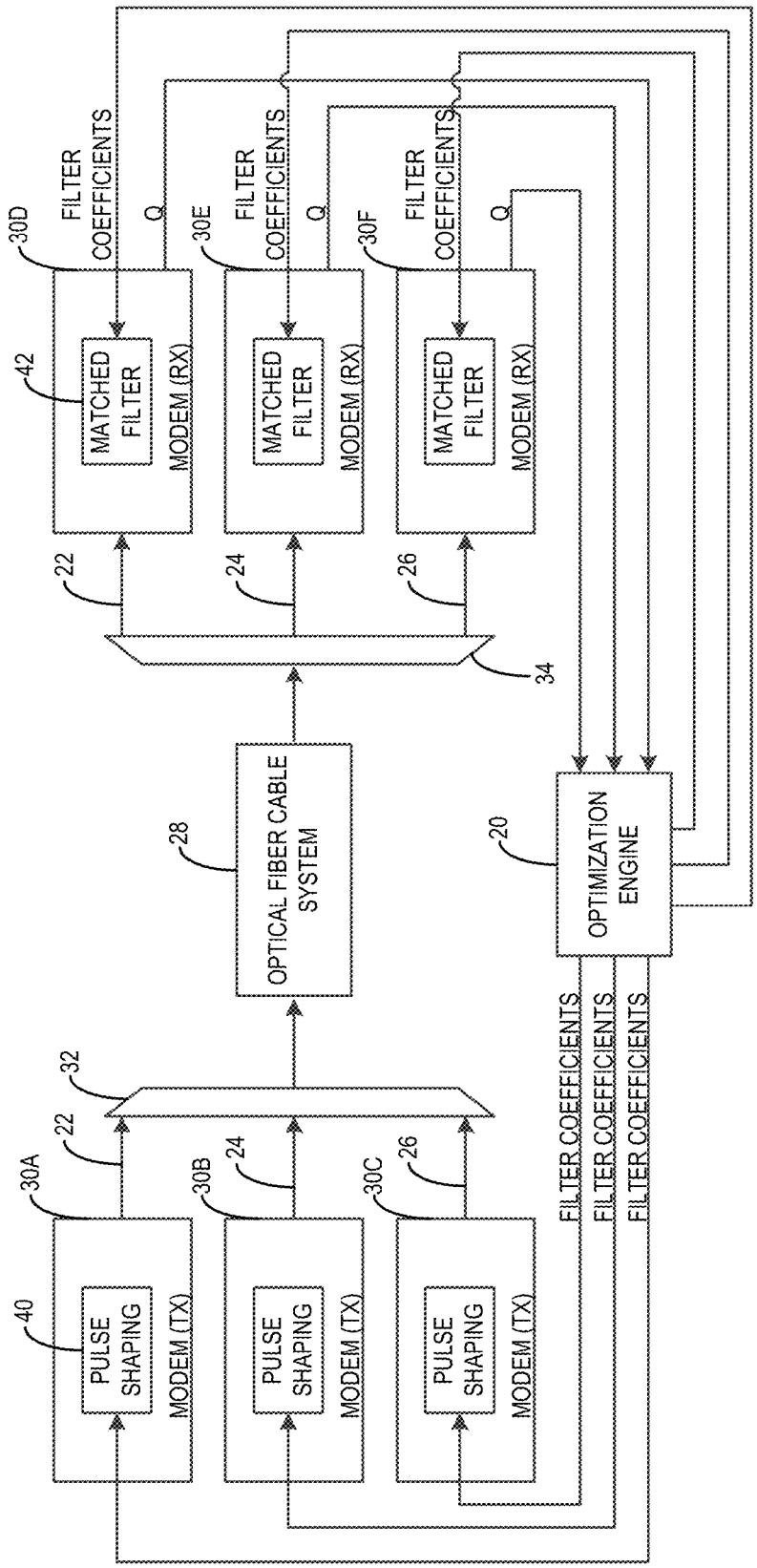
FIG. 1 is a block diagram of a fiber optic system with an optimization engine implementing a system-level optimization framework process.

In various exemplary embodiments, a system-level optimization framework is described for pulse shaping filters. Transmit and receive pulse shaping filters are directly optimized as part of an end-to-end, in-service optical communication system. Contrary to the conventional optimization approaches, there are no constraints such as inter-symbol interference (ISI)-free operation and out-of-band attenuation associated with this system-level optimization framework process, the only figure of merit being Q-factor maximization. Fiber optic networks are being deployed at the limit of technology and performance, and pulse shaping significantly influences the performance. The system-level optimization framework process described herein seeks to determine, in a particular situation (dispersion map, fiber length, interference from adjacent channels, presence of different non-linear effects, etc.), the optimal pulse shape. The process is performed taking into account all operating parameters and conditions to arrive iteratively at an optimal pulse shape. This is a field-based iterative approach rather than a simulated or calculated solution. As such, the system-level optimization takes into account all operating conditions. The system-level optimization framework described herein is applicable to any fiber optical network, such as a terrestrial system or a submarine system, flexible and fixed grid system, and the like. The system-level optimization framework specifically contemplates implementation as part of a working, multi-channel, end-to-end optical communication system, concurrently optimizing all channels in a system, based on a selected channel such as a worst-performing channel.

In the system-level optimization framework, the pulses are optimized as part of an end-to-end optical communication system with the only optimization goal to improve the Q-factor. All the constraints that would normally be considered (bandwidth, pulse symmetry, ISI free overall filter, etc.) are taken into account through the Q measurement. This single figure of merit with the Q measurements allows the system-level optimization framework to optimize considering the architecture of the system, hardware imperfections, the interaction between submodules (carrier recovery, butterfly filter, etc.), and the like.

Furthermore, the system-level optimization framework jointly optimizes the X and Y polarization pulse shaping filters (X/Y or Horizontal/Vertical polarizations), in a Polarization Multiplexed (PM) optical system. Another key aspect of this approach is that it can independently optimize the pulse shaping filter of each channel. For instance, consider three copropagating channels (Ch. 1, Ch. 2, Ch. 3), then using the system-level optimization framework, the pulse shape related to Ch.1 can be different than the pulse shape of Ch. 2 or Ch. 3. Similarly for Ch. 2 and Ch. 3, the pulse shapes associated with these channels can be different from the other channels. The process allows optimizing performance as a function of the propagation impairment that is experienced by each channel. The process adds a degree of liberty, and, therefore, facilitates the finding of a global optimal solution. Note, the system-level optimization framework contemplates operation in any type of WDM system but shows exceptional improvement in systems with super-Nyquist channel spacing.

In an exemplary embodiment, an optimization method configured to optimize filter coefficients in pulse shaping filters in transmitters and matched filters in receivers to maximize Q-factor in a Dense Wave Division Multiplexing (DWDM) system, includes receiving a measured Q-factor for each of one or more channels in the DWDM system; performing an optimization to maximize Q-factor for a selected channel of the one or more channels to determine adjusted filter coefficients in the pulse shaping filters and the matched filters; causing the pulse shaping filters and the matched filters to change the adjusted filter coefficients; receiving an updated measured Q-factor for each of one or more channels based on the adjusted filter coefficients; and iteratively performing the optimization until the Q-factor of the selected channel is maximized.

Referring to FIG. 1, in an exemplary embodiment, a block diagram illustrates a fiber optic system 10 with an optimization engine 20 implementing the system-level optimization framework process. For illustration purposes, the system 10 is illustrated with three optical channels 22, 24, 26 propagating through a fiber cable system 28. Of course, the optimization engine 20 and the system-level optimization framework process contemplates other embodiments with more or fewer channels. The channels 22, 24, 26 are formed by optical modems 30A, 30B, 30C, and the channels 22, 24, 26 are combined via a multiplexer 32 before input into the fiber cable system 28. At an opposite end of the fiber cable system 28, a demultiplexer 34 is configured to separate the channels 22, 24, 26 for input into respective optical modems 30D, 30E, 30F. Again, for illustration purposes, the modems 30A, 30B, 30C are transmitters and the modems 30D, 30E, 30F are receivers, and the system 10 is illustrated as a uni-directional link from the modems 30A, 30B, 30C to the modems 30D, 30E, 30F. Of course, the modems 30D, 30E, 30F can also include transmitters which connect to receivers in the modems 30A, 30B, 30C thus forming a bi-directional link. That is, the modems 30 can be transceivers. Further, the fiber cable system 28 can include various components (amplifiers, Optical Add/Drop Multiplexers, etc.) which are omitted for illustration purposes. Note, one advantage of the system-level optimization framework process is the fiber cable system 28 is treated as a black box since the measurements at the receivers fully incorporate all aspects of the fiber cable system 28. Finally, there may be other components in the system 10 which are also omitted for illustration purposes.

In operation, the channels 22, 24, 26 are formed by the transmitters in the optical modems 30A, 30B, 30C and propagate over the fiber cable system 28 to the receivers in the modems 30D, 30E, 30F. In one exemplary embodiment, the modems 30 can provide Dual Polarization (DP) Quadrature Amplitude Modulation (QAM) with flexible grid spacing of the optical carriers. In another exemplary embodiment, the modems 30 can provide DP-phase-shift keying (DP-PSK). Of course, other embodiments are also contemplated, including any dual polarization scheme, single polarization scheme, etc. The transmitters in the optical modems 30A, 30B, 30C each includes a pulse shaping filter 40 and the receivers in the optical modems 30D, 30E, 30F each includes a matched filter 42. The filters 40, 42 can be electrical domain digital filters. Also, the filters 40, 42 can include more than one filter, such as filters for the X and Y polarization (X and Y polarization can also be referred to as Horizontal and Vertical polarization). As digital filters, operating in the electrical domain, shapes of the filters 40, 42 can be changed by adjusting associated filter coefficients. The filters 40, 42 can include FIR digital filters, Infinite Impulse Response (IIR) digital filters, frequency or time domain digital filters, etc.

The optimization engine 20 is communicatively coupled to the receivers in the modems 30A, 30B, 30C to receive Q-factor of each of the channels 22, 24, 26 as an input, and to provide appropriate filter coefficients as outputs for the filters 40, 42 in each of the optical modems 30A, 30B, 30C, 30D, 30E, 30F. In one exemplary embodiment, the optimization engine 20 can take the Q-factors and maximize the Q-factor of the worst performing channel by acting upon the associated pulse shape's filter coefficients, since the worst performing channel limits the overall performance of the system 10. Alternatively, the optimization engine 20 can act on each channel individually to maximize its Q-factor. The optimization engine 20 operates in an iterative manner to select the optical pulse shape by adjusting the filter coefficients responsive to Q-factor measurements.

Figure 2:
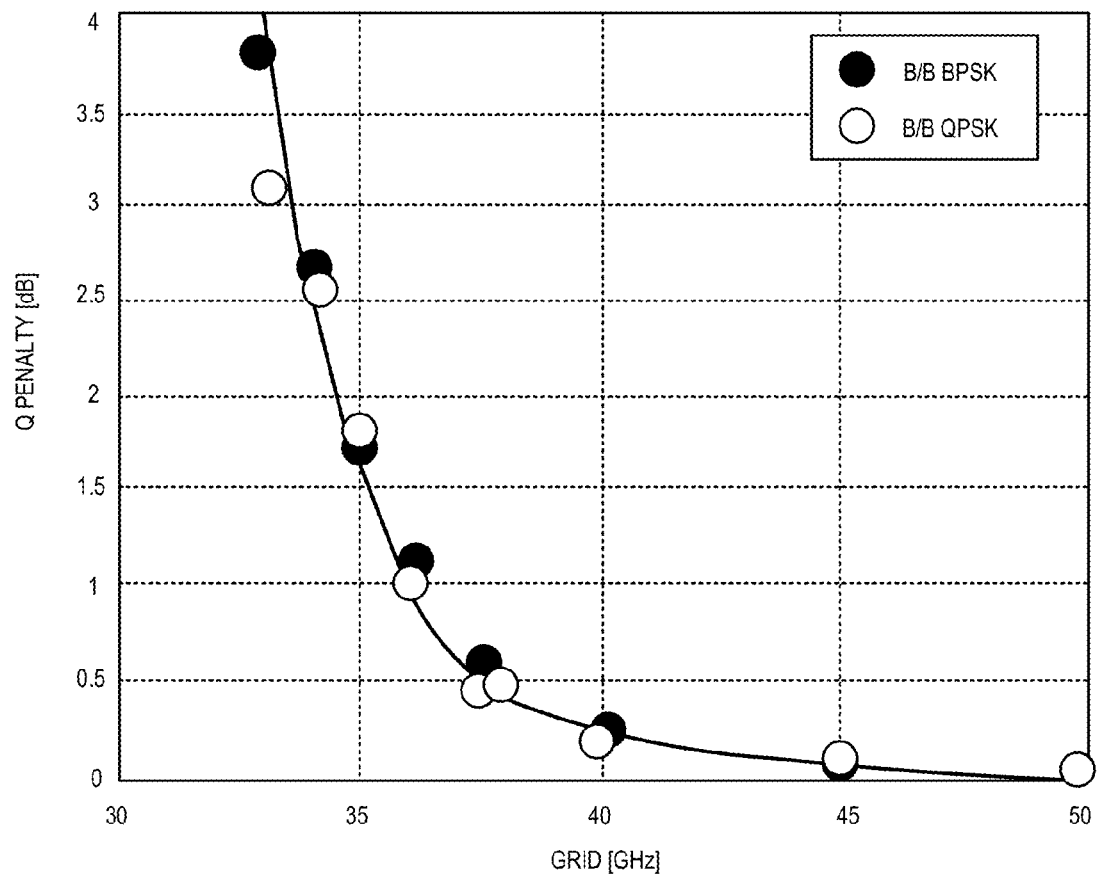
FIG. 2 is a graph of flexible grid spacing using Nyquist shaped channels for transceivers.

Referring to FIG. 2, in an exemplary embodiment, a graph illustrates flexible grid spacing using Nyquist shaped channels for submarine (undersea) transmission. FIG. 2 is from P. Mehta et al., "Flexible grid spacing using Nyquist-shaped channels for undersea transmission," Proc. SPIE 9288, Photonics North 2014, 928807 (Sep. 25, 2014), the contents of which are incorporated by reference herein. The graph in FIG. 2 is presented to show significant Q-factor degradation versus channel spacing, especially for super-Nyquist channel spacing. Specifically, the Photonics North paper presented an experimental study of various modulation formats (e.g., Dual Carrier-Polarization Multiplexed-Binary Phase Shift Keying (DC-PM-BPSK), Polarization Multiplexed-Quadrature Phase Shift Keying (PM-QPSK), and Polarization Multiplexed-16-Quadrature Amplitude Modulation (PM-16QAM) at 35 Gbaud for undersea transmission) in a WDM environment with frequency spacing ranging from 50 GHz (DWDM) to 33 GHz (super-Nyquist). The experimental study focused on noise, linear cross-talk, and nonlinear tolerance in two undersea applications: (1) Legacy dispersion-managed submarine cables up to 5,000 km in length and (2) New uncompensated submarine cables up to 12,500 km in length. The experimental study showed a reduction in frequency spacing below the symbol rate can be achieved, and quantify the performance penalties. The experimental study also presented a comparison of performance and reach between legacy dispersion-managed applications, and new uncompensated applications, as the frequency spacing is reduced below the symbol rate. It was shown that the constellation and line system dispersion map have a significant impact on the tolerance to linear and nonlinear interference generated by narrow frequency spacing.

The system-level optimization framework process was initially investigated for optimizing the filters 40, 42 for super-Nyquist channel spacing, subsequent to the work of the experimental study. For example, the recent commercial introduction of flexible grid DWDM technology has allowed increasing the capacity of optical communication systems by as much as 33% with super-Nyquist channel spacing, compared to current 50 GHz fixed grid implementations. However, this has performance penalties as shown in FIG. 2. Note, the super-Nyquist channel spacing can be less than 35 GHz spacing in a flexible grid system, and these channels show a significant Q penalty (e.g., 3-4 dB). Thus, optimizing all parameters such as the pulse shape is critical to operate under these conditions. Of course, the system-level optimization framework process is not limited to super-Nyquist channel spacing and/or flexible grid systems.

Figure 3:
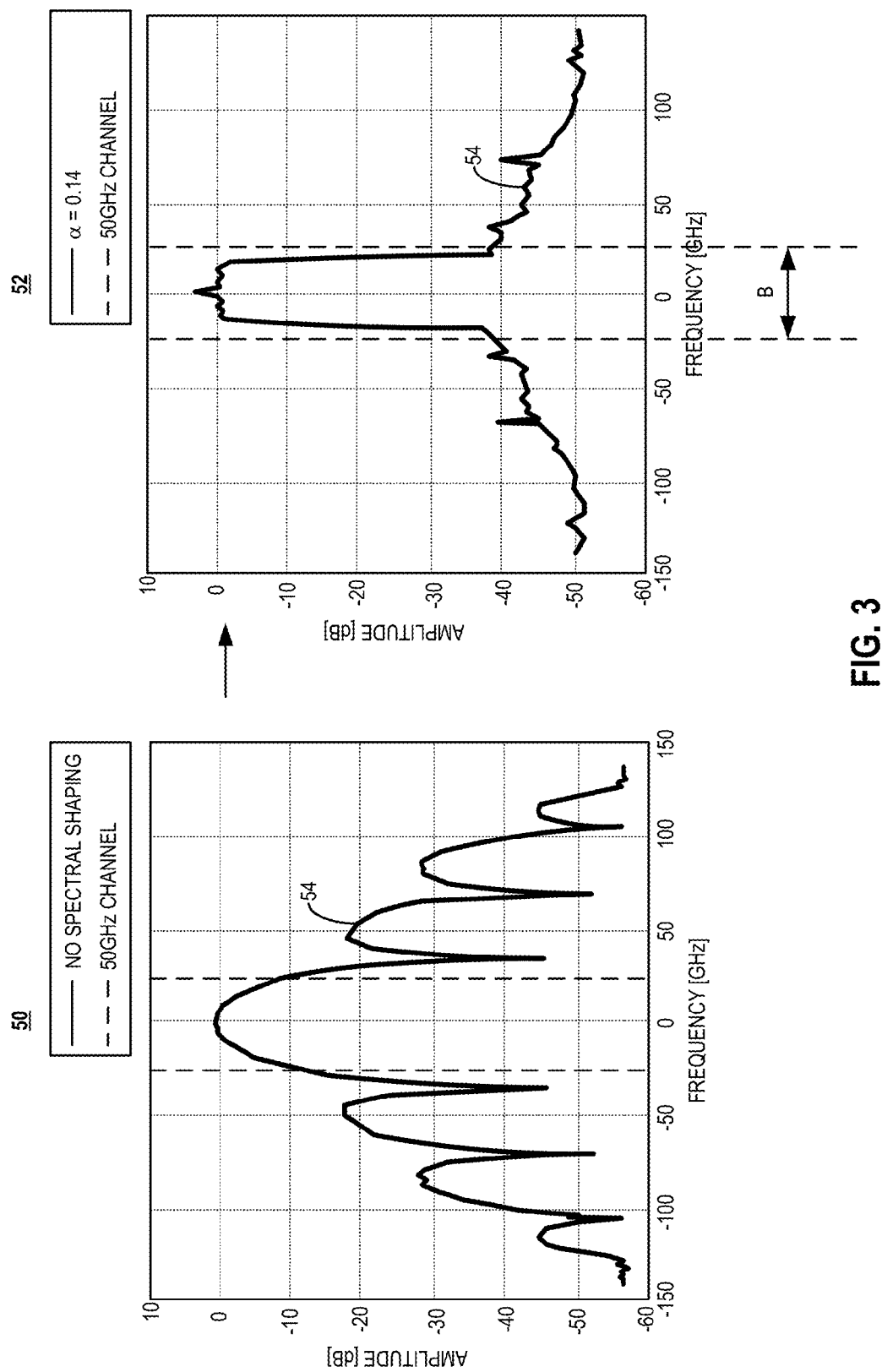
FIG. 3 is two spectrum diagrams illustrating no shaping and Nyquist channel shaping.

Referring to FIG. 3, in an exemplary embodiment, two spectrum diagrams 50, 52 illustrate standard and Nyquist channel shaping. Specifically, the spectrum diagram 50 illustrates no spectral shaping thereon and the boundaries for a 50 GHz channel. The spectrum diagram 52 illustrates the channel subsequent to Digital Signal Processing (DSP) or optical-based filtering to remove high-frequency content. For example, in the spectrum diagram 52, the channel was filtered with a Root-Raised-Cosine (RRC) filter with $\alpha=0.14$. Thus, subsequent to the filtering, the channel occupies B GHz of optical spectrum.

Figure 4:
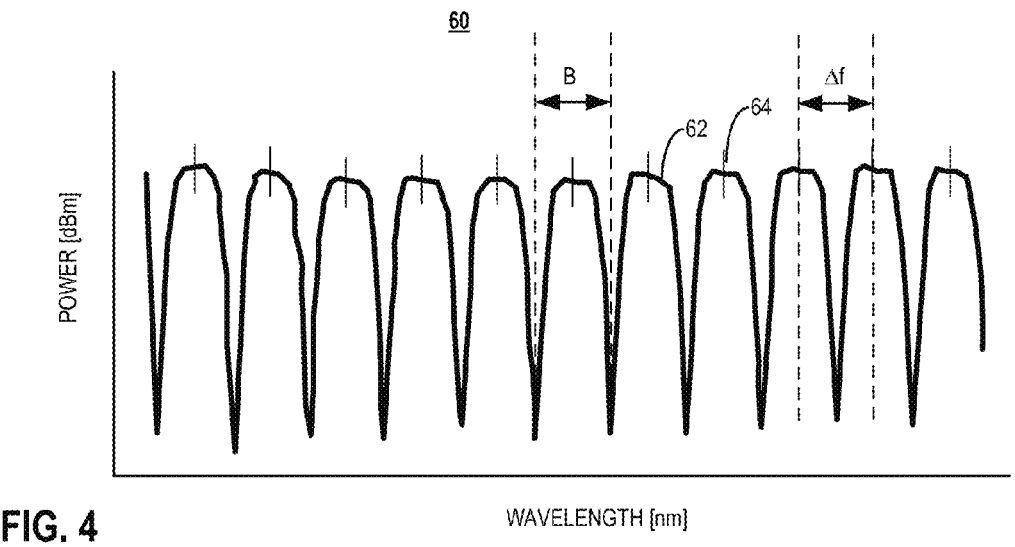
FIG. 4 is a spectrum diagram of a plurality of channels.

Referring to FIG. 4, in an exemplary embodiment, a spectrum diagram 60 illustrates a plurality of channels 62. Each of the channels 62 has a center frequency or wavelength 64. Each channel 62 occupies B amount of spectrum, and the spacing between the center frequency or wavelength 64 of adjacent channels is defined as $\Delta f$. In I. Kaminow, T. Li, A. E. Villner, "Optical Fiber Telecommunications Volume VIB: Systems and Networks", Academic Press, $6^{th}$ edition, 2013, the contents of which are incorporated by reference, the following definitions are presented for Nyquist channel spacing:

TABLE 1

Nyquist channel spacing definitions

| Definition* | Condition ($\Delta f/B$) |
| --- | --- |
| "Quasi-Nyquist" | $1.0 < \Delta f/B < 1.2$ |
| "Nyquist" Wavelength Division Multiplexed (WDM) | $\Delta f/B = 1$ |
| "Super-Nyquist" WDM | $\Delta f/B < 1$ |

With Nyquist channel spacing, the objectives are to space channels as close as possible without incurring significant penalties, avoiding spectral deadzones to provide more capacity, spectral efficiency and a flexible grid. Referring back to FIG. 2, it is shown that Q degradation relative to channel spacing steepens with propagation and depends on link composition. Specifically, there is significant Q degradation (3-4 dB) at super-Nyquist channel spacing (<35 GHz).

The system-level optimization framework was investigated to reduce this significant Q degradation, and as described herein, is shown to have significant improvement. The system-level optimization framework is shown herein to improve significantly Q performance at super-Nyquist channel spacing. However, it is also useful in any other context, i.e., non-super-Nyquist channel spacing and the like.

Figure 5:
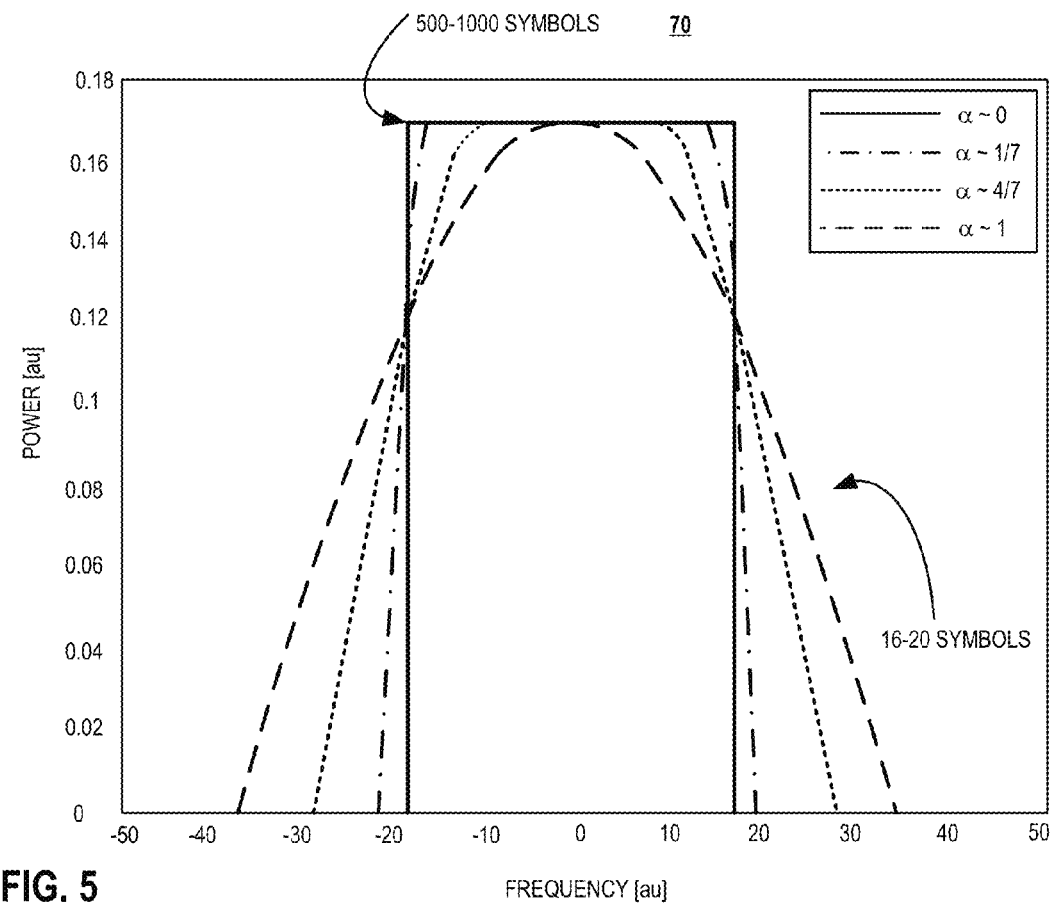
FIG. 5 is a frequency diagram of Finite Impulse Response (FIR) filters with varying roll-off factors ($\alpha$)

Referring to FIG. 5, in an exemplary embodiment, a frequency diagram 70 illustrates FIR filters with varying roll-off factors ($\alpha$). For example, the frequency diagram 70 illustrates FIR filters with $\alpha$ at about 0, $\frac{1}{7}$, $\frac{4}{7}$, and 1. In an exemplary embodiment, the filters are digital filters with adjustable coefficient values (symbols), such as IIR, FIR, etc. digital filters. The filters are digital circuit blocks and can operate in the time domain or frequency domain. For comparison, a filter with $\alpha$ at about 1 requires about 16-20 symbols whereas a filter with $\alpha$ at about 0 requires more than 500 symbols.

Figure 6:
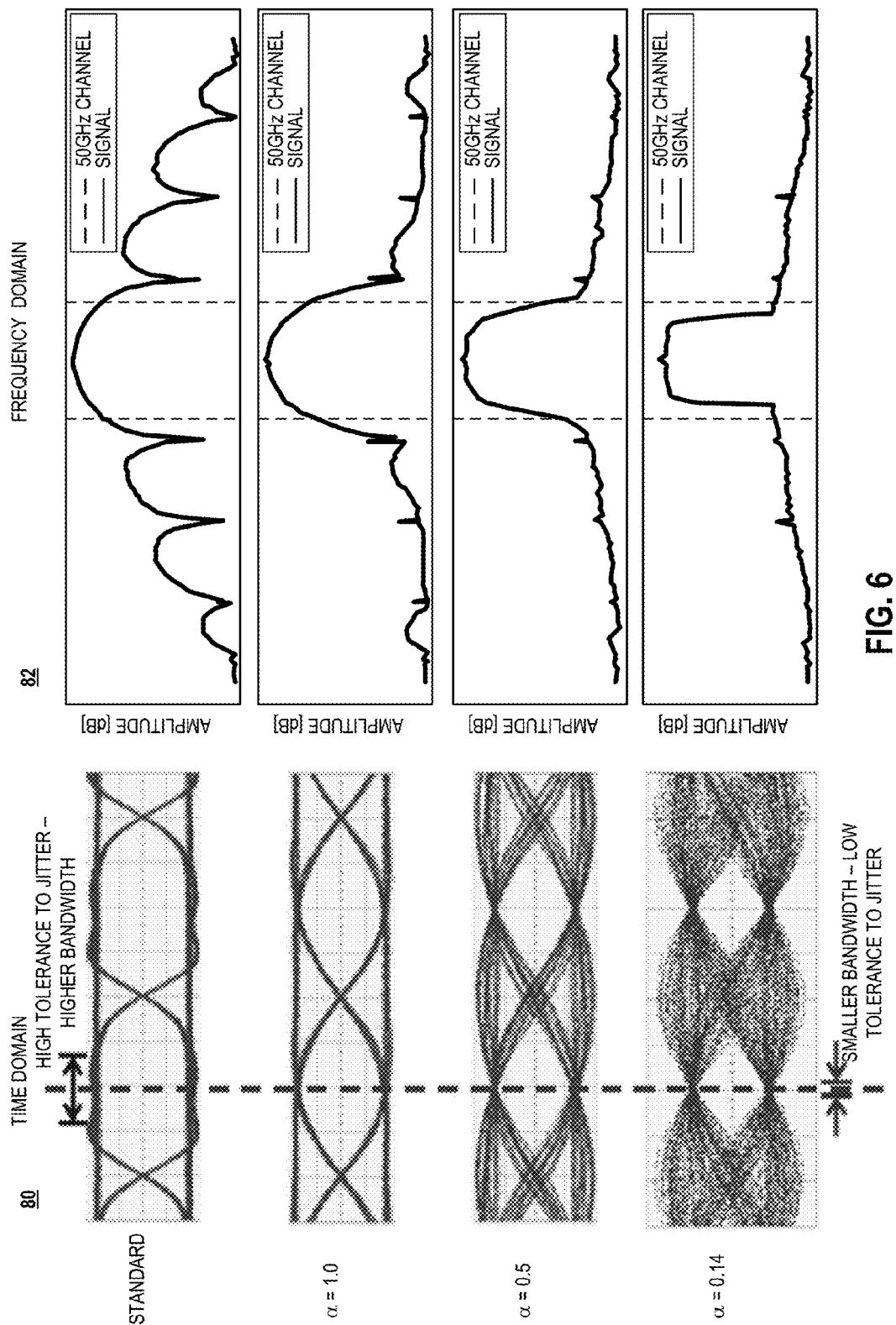
FIG. 6 is time domain diagrams and frequency domain diagrams of a channel (in the time domain and frequency domain, respectively) after various filters with associated roll-off factors ($\alpha$)

Referring to FIG. 6, in an exemplary embodiment, time domain diagrams 80 and frequency domain diagrams 82 illustrate a channel (in the time domain and frequency domain, respectively) after various filters with associated roll-off factors ($\alpha$). Specifically, the diagrams 80, 82 illustrate a same channel in the time domain and the frequency domain with filtering (labeled as standard) and with filters with $\alpha$ at about 1.0, 0.5, and 0.14. With each subsequent reduction in a, the channel has more higher frequency content removed. This is shown in the time domain diagrams 80 where the signal quality degrades significantly from $\alpha$ at about 1.0, 0.5, and 0.14. Without filtering, there is higher bandwidth and hence a high tolerance to jitter while, with a filter of $\alpha$ at 0.14, there is smaller bandwidth and a low tolerance to jitter.

Figure 7:
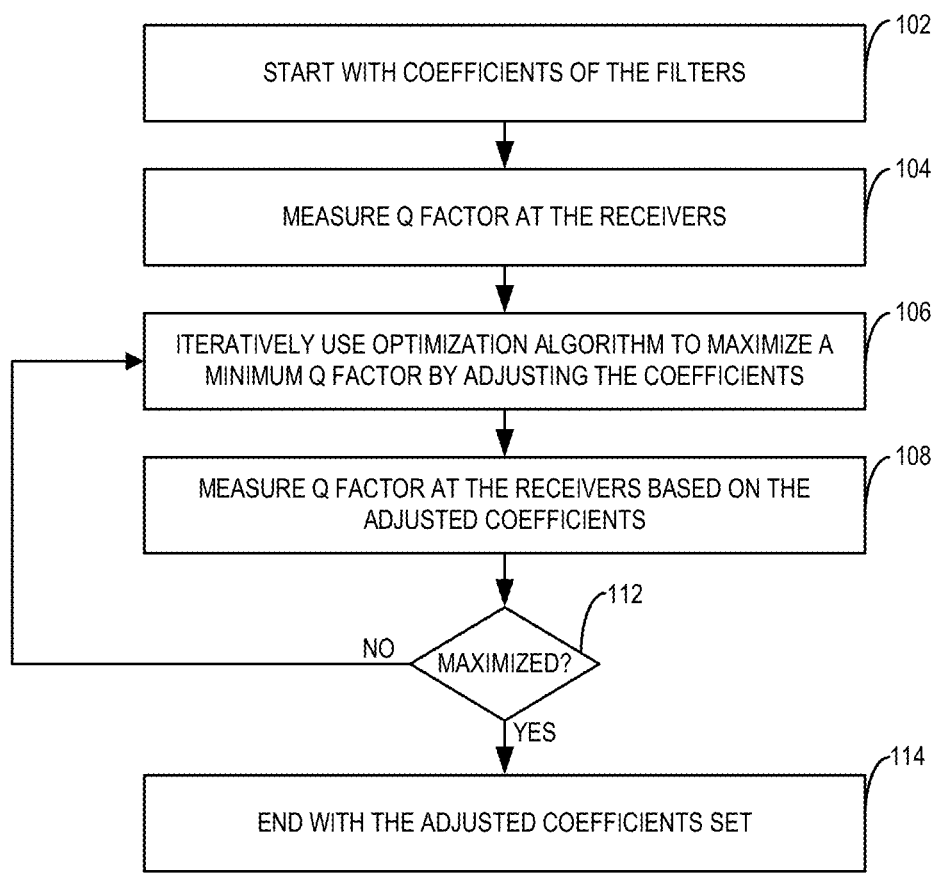
FIG. 7 is a flow chart of a system-level optimization framework process.

Referring to FIG. 7, in an exemplary embodiment, a flow chart illustrates a system-level optimization framework process 100. Given a particular setup, hardware implementation, operating conditions, etc., the system-level optimization framework process 100 experimentally determines which pulse shape is optimal for the filters 40, 42, such as optimizing the pulse for best performance (max Q-factor=min Bit Error Rate (BER)). The goal is to include in the optimization all the variables that affect performance (bandwidth of TX and RX, Digital-Analog Converter (DAC) resolution, implemented carrier recovery algorithm, laser linewidths, etc.), and the Q-factor measurement experimentally embodies all of these variables, while a system is operational. In an exemplary embodiment, the system-level optimization framework process 100 is implemented by the optimization engine 20 in the system 10.

The system-level optimization framework process 100 includes starting with coefficients of the filters 40, 42 (step 102). These coefficients can be preset to default values, set based on calibration or system turn-up, previously set with an operation of the system-level optimization framework process 100, or the like. Again, the pulse shaping filter 40 and the matched filter 42 are digital filters with adjustable coefficient values, such as IIR, FIR, etc. digital filters. The process 100 includes measuring Q-factor at the receivers (step 104). Again, the receivers can be part of the optical modems 30. In one exemplary embodiment, the Q-factor is measured for representative channels in a DWDM system, such as on three center channels. In another exemplary embodiment, the Q-factor is measured for all channels in the DWDM system. In yet another exemplary embodiment, the Q-factor can be measured for one or more arbitrary channels in the DWDM system. Specifically, the process 100 contemplates the operation on one channel at a time, on multiple channels at the same time, or on all channels at the same time. In simulations described herein, the Q-factor is measured on the three center channels and the goal of the process 100 is to maximize the Q-factor of the channel showing the minimum Q-factor out of the three center channels.

The process 100 includes iteratively using an optimization algorithm to maximize a minimum Q-factor by adjusting the coefficients (step 106). The minimum Q-factor can be based on which channels are measured in step 104. In the case with three center channels, the goal is to optimize the filter coefficients so that the minimum Q value out of the three channels is maximized. In the case of multiple channels, the goal is to optimize the filter coefficients so that the minimum Q value out of the multiple channels is maximized. In the case where all channels have the Q factor measured, the goal can be to maximize a selected channel's Q-factor, and that selected channel does not necessarily have to be the minimum Q value. The process 100 utilizes an iterative optimization algorithm such as iterative Sequential Quadratic Programming (SQP). Other iterative optimization algorithms are also contemplated. In operation, the step 106 includes determining adjustments to the coefficients which are provided to the filters 40, 42.

The SQP algorithm is an iterative optimization algorithm that finds a solution to convex or non-convex problems that are linearly or non-linearly constrained. SQP uses a quadratic approximation of an objective function and a linear approximation of the constraints. For example, in the case of the three center WDM channels, the objective function is expressed as follows: maximize[min[$Q_1$ $Q_2$ $Q_3$]], where $Q_n$ is the measured Q-factor at the $Rx_n$. $Q_1$ is a function of the Tx and Rx pulse shaping filters 40, 42 associated with channel 1, but also based on the Tx and Rx pulse shaping filters 40, 42 of channels 2 and 3 (since the Q-factor on channel 1 depends on the Tx signal shape of channel 2 and 3). Similarly, for $Q_2$ and $Q_3$, these Q-factors depend on the pulse shaping filters 40, 42 of channels 2 and 3, and also channel 1. Thus, a Q-factor for a particular channel is dependent on the pulse shaping filters 40, 42 for the channel and dependent on all other pulse shaping filters 40, 42 for all other channels. Note, in a generalized case with n channels, the objective function can be expressed as follows maximize [min[$Q_1$ $Q_2$ ... $Q_n$]]. Additionally, the Q-factor is also a function of propagation impairments.

The optimization variables can be the coefficients of the FIR Tx and pulse shaping filter 40 and the Rx matched filter 42 of the channels 1, 2, and 3, in the three center WDM channel case. For example, if every FIR filter includes 64 coefficients, then the optimization variables would be 2×64×3=384 real numbers. Generalized, if every filter 40, 42 has Z coefficients, then the optimization variables would be 2×Z×n real numbers where n is the number of channels. For example, at each iteration, using the current filters' coefficients, the Q-factor for all the channels is determined (e.g., the Q-factor can be determined using a simulation model, or, in a working system, the Q-factor is directly obtained from each of the receiver) and the SQP algorithm finds new coefficients.

For example in the three center WDM channel case, the SQP algorithm iterates until no improvement are obtained in the Q-factor of $Q_1$, $Q_2$, or $Q_3$. In summary, the inputs to the SQP algorithm are the objective function (the goal of the optimization) and the initial values of the pulse shaping filters coefficients (in this case, RRC coefficients can be used as the starting point).

Other techniques are also contemplated. For example, any implementation of a modern metaheuristic could be used for the optimization algorithm. One advantage of the SQP algorithm is the fact that it is deterministic while the metaheuristic are stochastic in nature and, therefore, for the same problem, the result of one optimization may vary from one run to the other. As described above, the objective function involves directly optimizing the Q-factor in a multi-channel transmission scenario, taking the minimum Q out of the channels under optimization and maximizing it. Note that this formulation of the objective function (max min[$Q_1$, $Q_2$, ... $Q_N$], where N is the number of channels being optimized) is necessary since the overall system performance is limited by the worst performing channel.

Although blind search algorithms could possibly be used to solve this problem, it seems that the solution space is too wide for this type of algorithm. Consider the example above, 384 coefficients, each represented by a binary number of 12 bits, a first approximation indicate that the number of possible states would be $2^{(384 \times 12)}$, which is prohibitive.

After the optimization algorithm in the step 106, the Q-factor is measured again at the receivers based on the adjusted coefficients (step 108), and it is determined whether the adjusted coefficients have maximized the minimum Q-factor of the measured channels (step 110). If so, the process 100 ends with the adjusted coefficients used to for the filters 40, 42—there adjusted coefficients have iteratively and experimentally been shown to maximize the Q-factor of the minimum performing channel of the measured channels. If not, the process 100 returns to the step 106 to perform another iteration.

Of note, the process 100 is a joint X and Y polarization pulse optimization; the impulse response associated with the X polarization is allowed to be different than the impulse response associated with the Y polarization. The process 100 does not limit the search to inter-symbol interference (ISI) free pulses, there are no constraints, the only goal being the maximization of Q-factor of the measured channels, and pulse symmetry is not enforced. The process 100 or a variant thereof can be used to optimize other sub-systems (carrier recovery, TX pre-compensation, etc.).

The process 100 optimizes the pulse shapes using the Q-factor as the single figure of merit. Again, there are no constraints; the only goal being to maximize performance. One advantage of the Q-factor is that all the constraints that would normally be considered (bandwidth, pulse symmetry, ISI free overall filter, etc.) are taken into account through the Q-factor measurement. This allows the process 100 to perform the optimization considering the architecture of the system, hardware imperfections and the interaction between submodules (carrier recovery, butterfly filter, etc.). Again, by optimizing for Q-factor, all the variables that affect performance are automatically taken into account (bandwidth of TX and RX, DAC resolution, implemented carrier recovery algorithm, etc.).

In one exemplary embodiment, the process 100 includes starting with a Root-Raised-Cosine (RRC) filter or the like for the filters 40, 42, measuring BER or Q-factor at the receiver, optimizing the filter coefficients using SQP or the like, and changing the filter coefficients based on the optimizing. This process can be iterated until a best BER or Q-factor is obtained. In experiments, the process 100 was verified using MATLAB to implement the SQP algorithm, manually adjusting finite impulse response (FIR) filter coefficients, taking measurements, and rerunning the SQP algorithm.

For the MATLAB simulations, MATLAB's implementation of the SQP algorithm was used to optimize 3 channels with Tx and Rx filters 40, 42 each having 32 coefficients (total of 32×2×3=192 optimization variables). An optimization took about 30-45 minutes with a few thousands of iterations. For practical implementations, faster versions of the SQP algorithm can be used (e.g., coded in C). However, since the optimization scheme is not meant to work in real-time (the optimization is done once at the turn-up of the system or when channels are added/removed), the timing is not important since the implementation of the process 100 is performed in-service and does not affect in-service channels.

The process 100 can be implemented during setup of a DWDM system. Subsequently, the process 100 can be rerun where there are network events on the DWDM system, such as channel additions, deletions, switching of channels, etc. The process 100 may also be run responsively to detecting degradation or manually implemented based on a user request.

Figure 8:
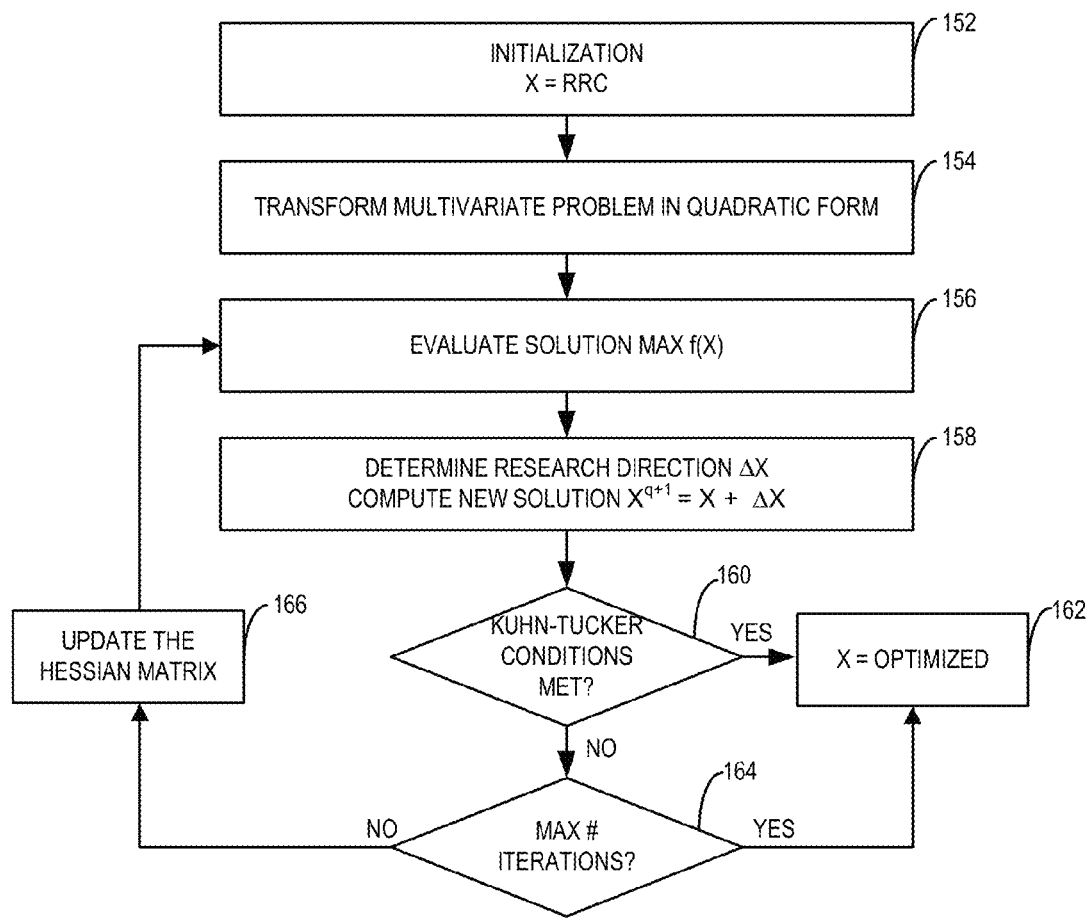
FIG. 8 is a flow chart of another system-level optimization framework process.

Referring to FIG. 8, in an exemplary embodiment, a flow chart illustrates another system-level optimization framework process 150. Note, the system-level optimization framework process 150 provides additional details relative to the system-level optimization framework process 100. Specifically, the system-level optimization framework process 150 can be implemented in combination with the system-level optimization framework process 100. Again, given a particular setup, hardware implementation, operating conditions, etc., the system-level optimization framework process 150 experimentally determines which pulse shape is optimal for the filters 40, 42, such as optimizing the pulse for best performance (max Q-factor=min Bit Error Rate (BER)). The goal is to include in the optimization all the variables that affect performance (bandwidth of TX and RX, Digital-Analog Converter (DAC) resolution, implemented carrier recovery algorithm, laser linewidths, etc.), and the Q-factor measurement experimentally embodies all of these variables, while a system is operational. In an exemplary embodiment, the system-level optimization framework process 150 is implemented by the optimization engine 20 in the system 10.

The system-level optimization framework process 150 begins via initialization, such as initial conditions including coefficients of an RRC filter, i.e., the filter X=RRC (step 152). The system-level optimization framework process 150 transforms a multivariate problem in quadratic form (step 154) and evaluates a solution to maximize f(X). Again, the system-level optimization framework process 150 can use an SQP optimization algorithm which can optimize filter coefficients for the best Q-factor on three channels. For example, the objective function: maximize[min[$Q_1$ $Q_2$ $Q_3$]], where $Q_N$ is the Q-factor measured at the $Rx_N$.

The system-level optimization framework process 150 includes determining a research direction ΔX to compute a new solution for an iteration, $X^{q+1}=X+\Delta X$ (step 158). The new condition is checked to see if Kuhn-Tucker conditions are met (step 160), and if so, the system-level optimization framework process 150 has X=optimized and ends (step 162). If the Kuhn-Tucker conditions are not met (step 160), the system-level optimization framework process 150 checks if a maximum number of iterations has been reached (step 164), and if so, the system-level optimization framework process 150 has X=optimized and ends (step 162). Specifically, the system-level optimization framework process 150 can have the maximum number of iterations to ensure the system-level optimization framework process 150 does not continue forever. If there are more iterations, the system-level optimization framework process 150 includes updating a Hessian matrix (step 166) and evaluating a solution for max f(X) (step 156). Note that in this case max f(X), corresponds to max min[$Q_1$, $Q_2$, ... $Q_N$], where N is the number of channels being optimized, as previously described.

Advantageously, the system-level optimization framework process 150 has no limitation for ISI free pulses, no constraints, and pulse symmetry is not enforced. The system-level optimization framework processes 100, 150 can be useful for carrier recovery, dispersion pre/post-compensation, etc.

Figure 9:
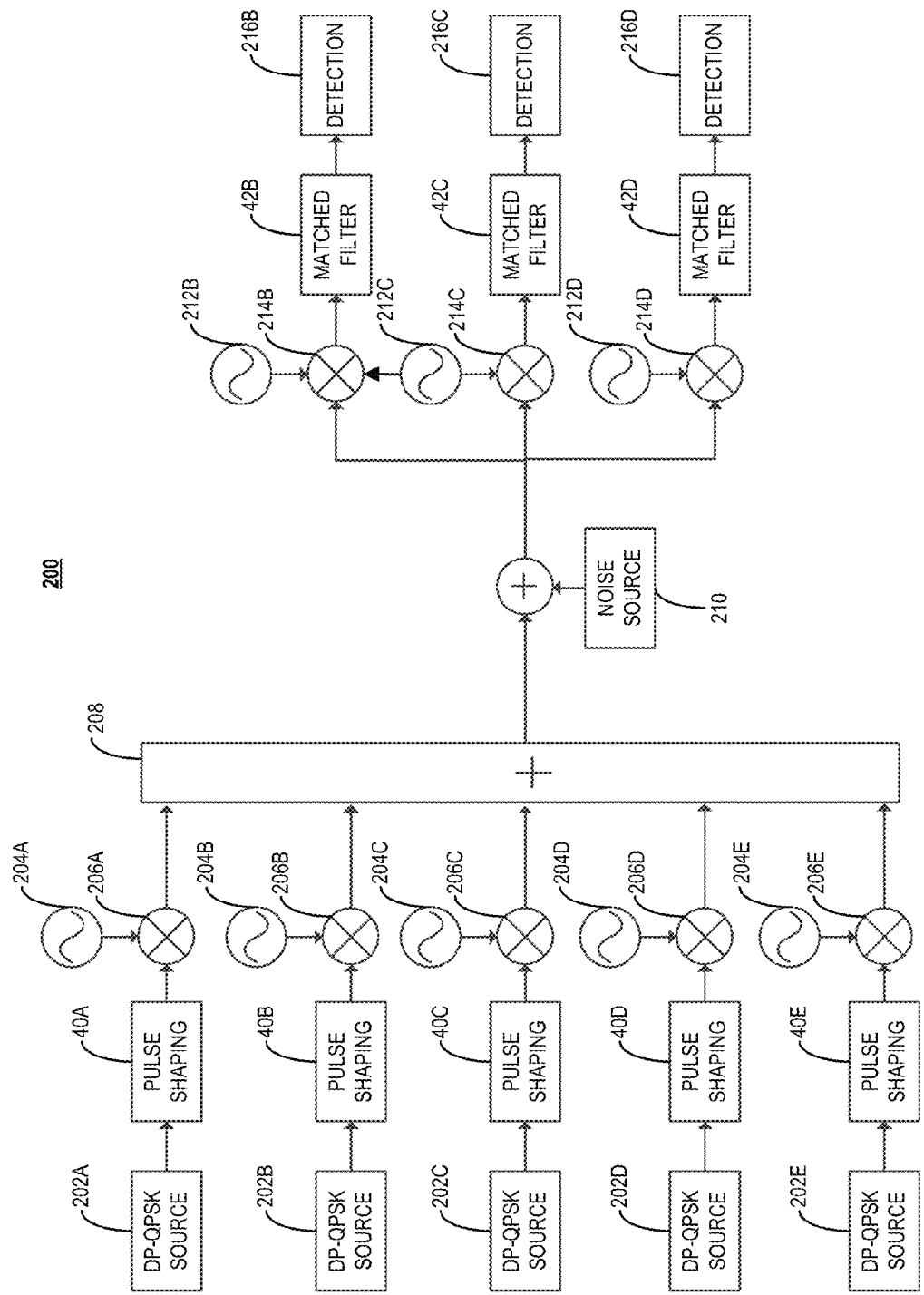
FIG. 9 is a block diagram of a model system used to simulate and verify the process of FIG. 1.

Referring to FIG. 9, in an exemplary embodiment, a block diagram illustrates a model system 200 used to simulate and verify the system-level optimization framework processes 100, 150. The model system 200 includes five DWDM dual-polarization (DP)-QPSK channels at 35 Gbaud in a back-to-back configuration. Specifically, the five DP-QPSK channels each include a DP-QPSK source 202 (labeled as sources 202A-202E), a pulse shaping filter 40 (labeled as filters 40A-40E), a local oscillator 204 (labeled as local oscillators 204A-204E), and mixers 206 (labeled as mixers 206A-206E). Each of the channels is combined via a multiplexer 208, and propagation over transmission fiber was simulated with a noise source 210. On the receive side, three channels are shown which include a local oscillator 212 (labeled as local oscillators 212B-212D), mixers 214 (labeled as mixers 214B-214D), matched filters 42 (labeled as matched filters 42B-42D), and detection 216 (labeled as detection 216B-216D). Note, this exemplary embodiment utilizes three channels for the optimization as described above. Thus the receivers are not shown for the DP-QPSK sources 202A, 202E.

Figure 10:
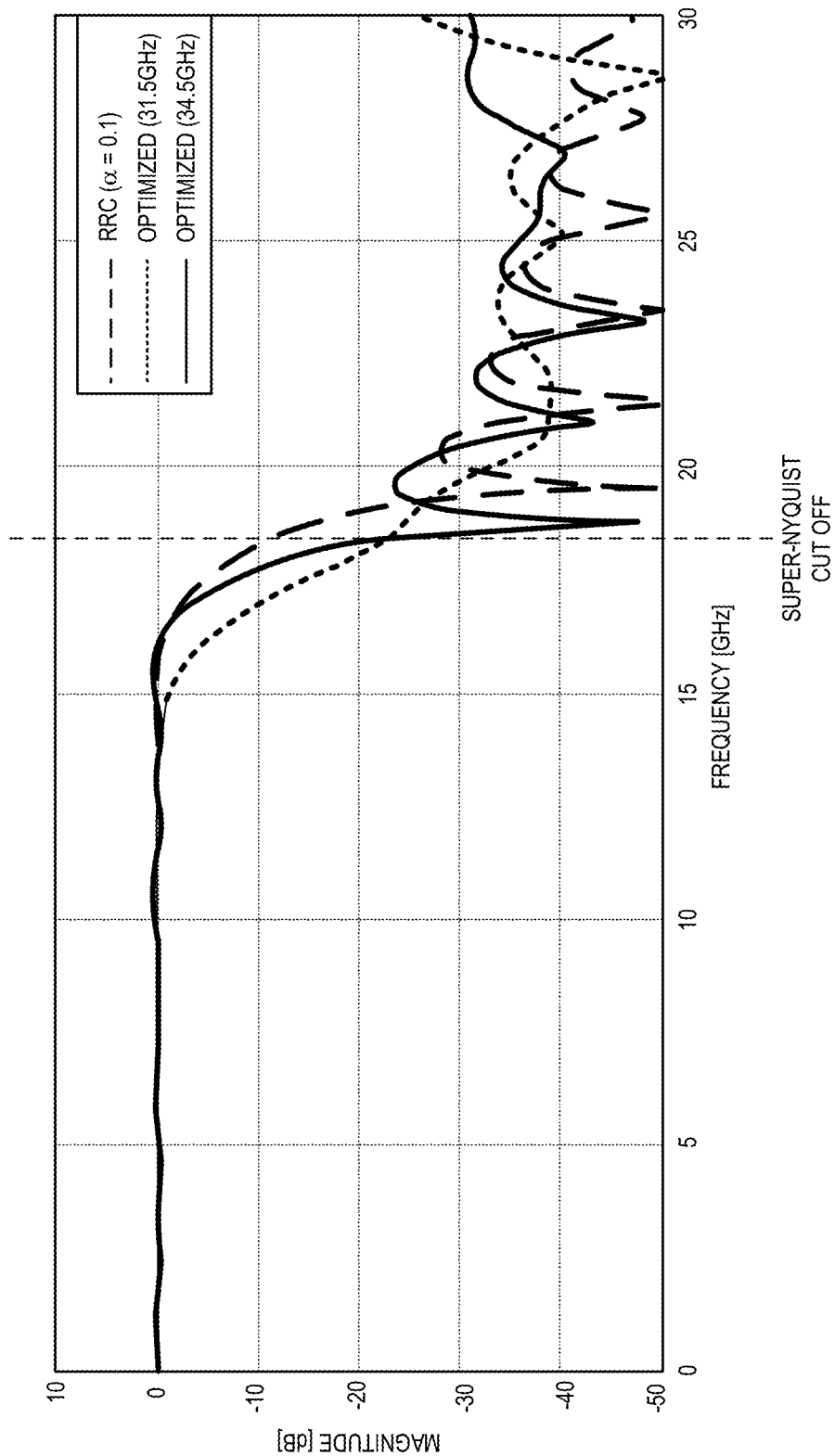
FIG. 10 is a graph of filter responses using the system-level optimization framework processes of FIGS. 7 and 8.
Figure 11:
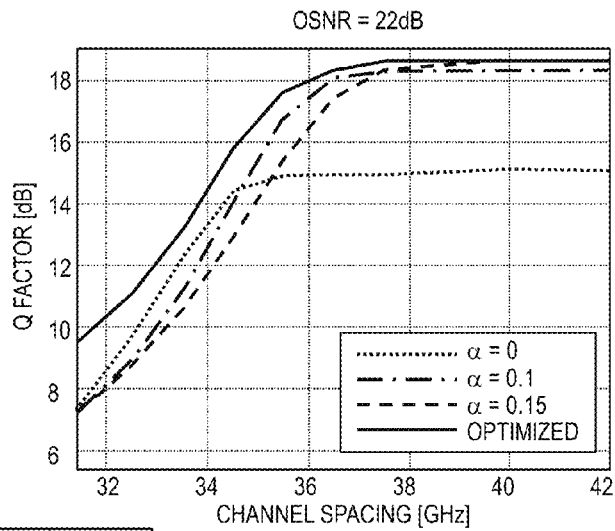
FIGS. 11, 12, and 13 are graphs of optimization results from the model system of FIG. 9 with varying Optical Signal-to-Noise Ratio (OSNR) specifically OSNR=22 dB (FIG. 11), OSNR=16 dB (FIG. 12), and OSNR=12.5 dB (FIG. 13)
Figure 12:
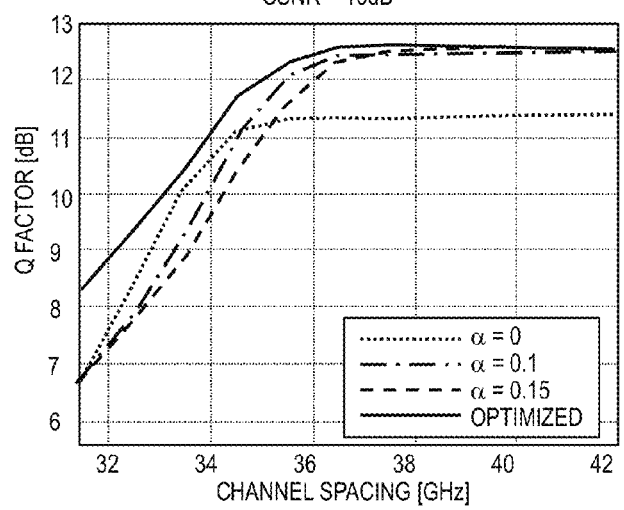
Figure 13:
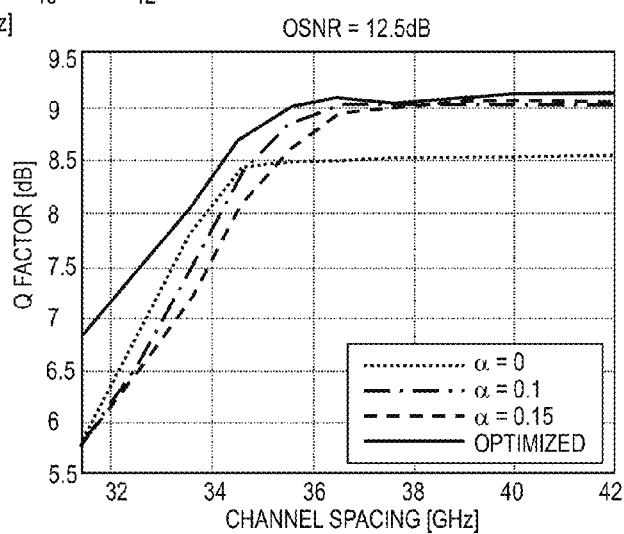
Figure 14:
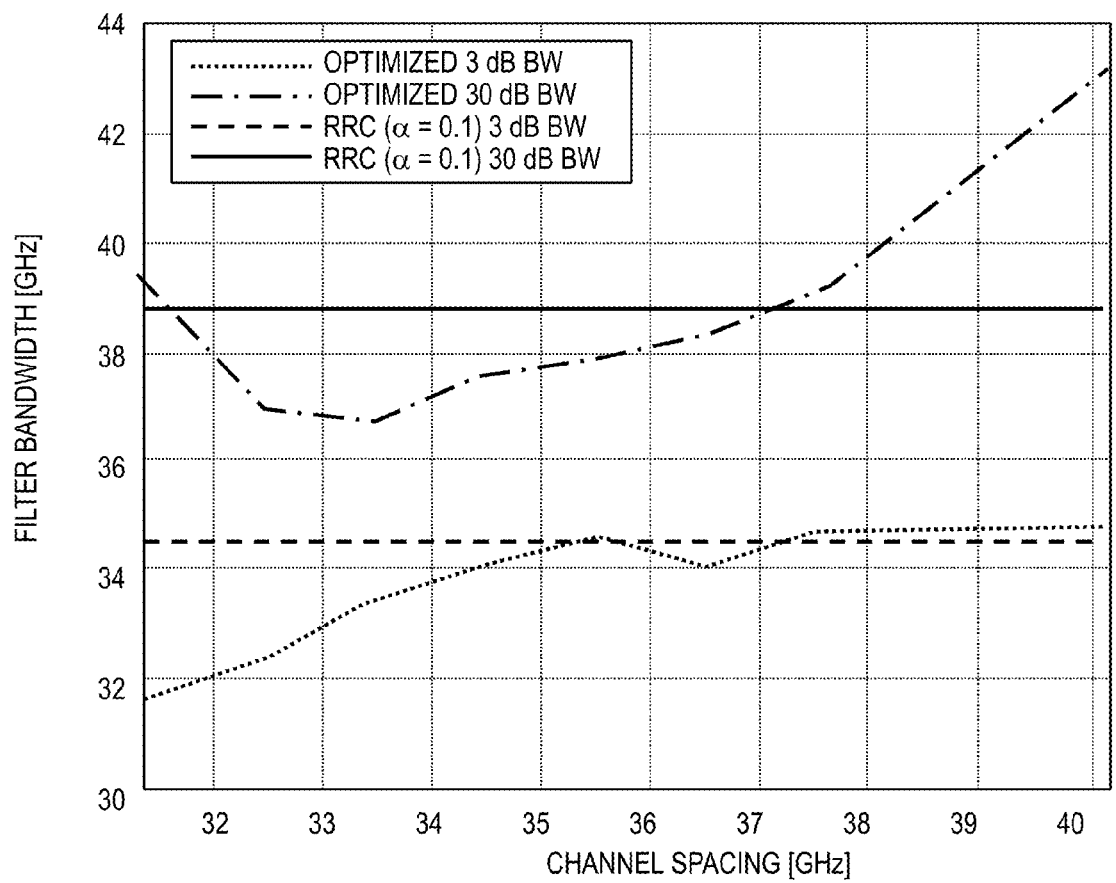
FIG. 14 is a graph of filter bandwidth versus channel spacing.
Figure 15:
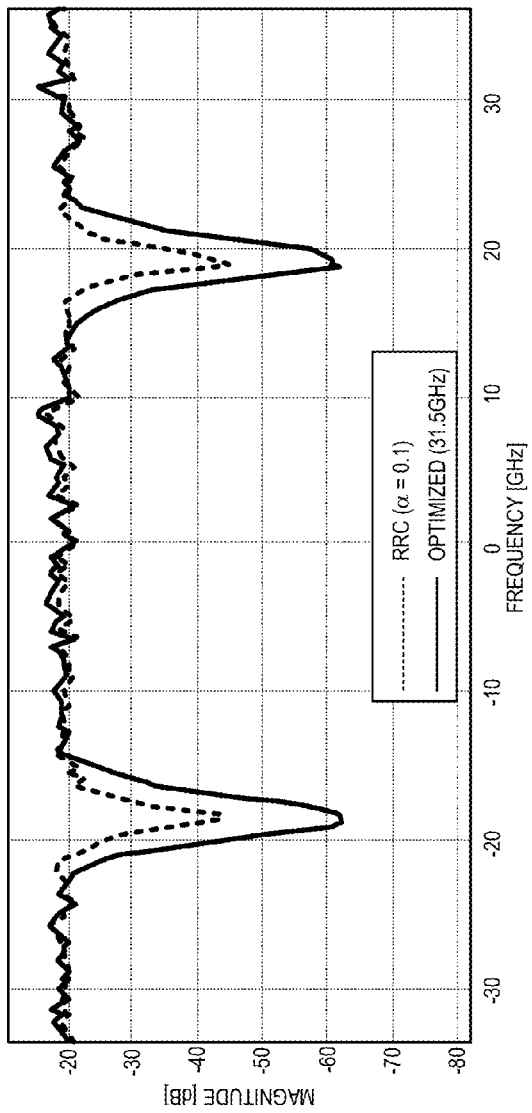
FIGS. 15 and 16 are graphs of resulting optical Transmitter (Tx) spectral density diagrams under super-Nyquist conditions.
Figure 16:
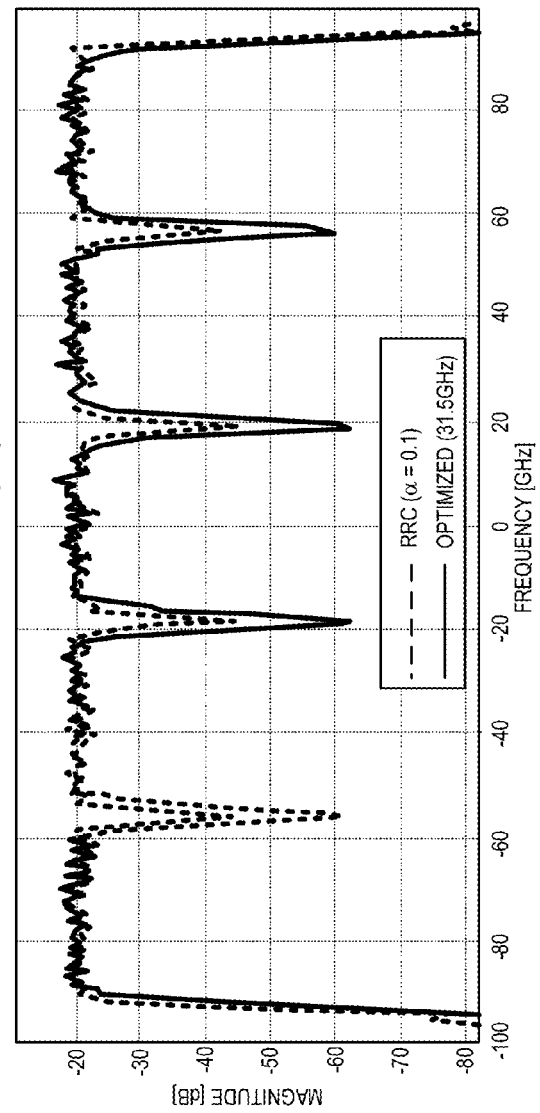
Figure 17:
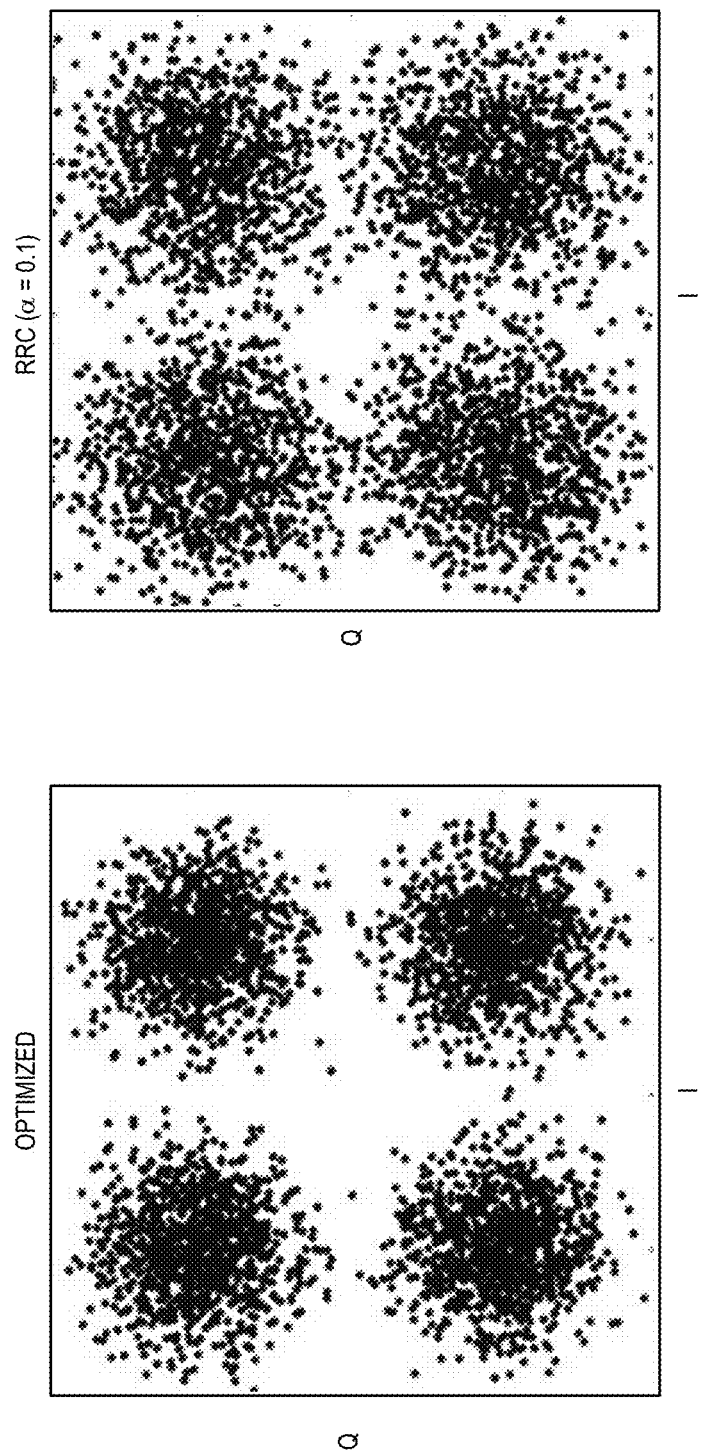
FIG. 17 is a graph of resulting optical Receiver (Rx) constellations at 31.5 GHz with and without optimization.
Figure 18:
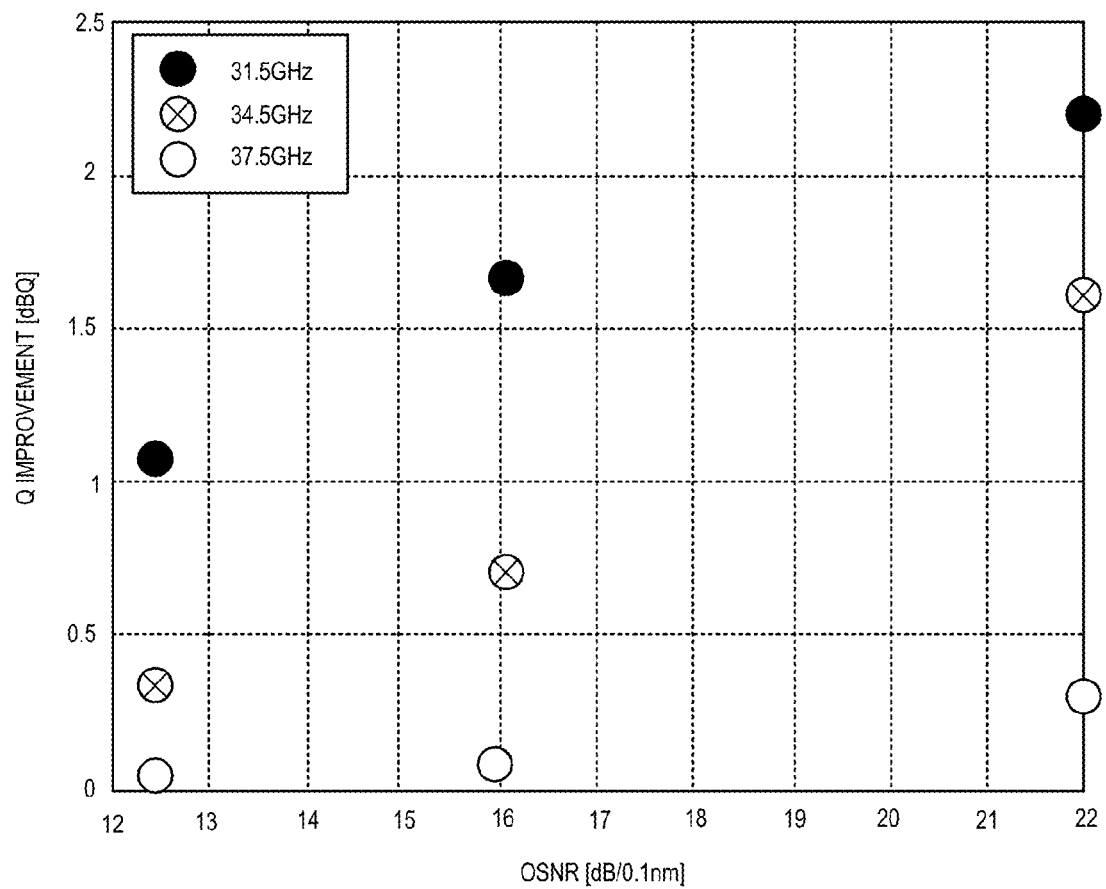
FIG. 18 is a graph of Q improvement versus OSNR for different channel spacing.

Referring to FIGS. 10-18, in various exemplary embodiments, graphs illustrate results from the system-level optimization framework processes 100, 150 using the model system 200. FIG. 10 is a graph of filter responses using the system-level optimization framework processes 100, 150. FIGS. 11, 12, and 13 are graphs of optimization results from the model system 200 with varying Optical Signal-to-Noise Ratio (OSNR) specifically OSNR=22 dB (FIG. 11), OSNR=16 dB (FIG. 12), and OSNR=12.5 dB (FIG. 13). FIG. 14 is a graph of filter bandwidth versus channel spacing. FIGS. 15 and 16 are graphs of resulting optical Tx spectral density diagrams under super-Nyquist conditions. FIG. 17 is a graph of resulting optical Rx constellations at 31.5 GHz with and without optimization. FIG. 18 is a graph of Q improvement versus OSNR for different channel spacing.

For the model system 200, a sequential quadratic programming algorithm was used for the optimization procedure. In FIG. 10, the baseband frequency response of the filter is shown, for RRC (α=0.1), optimized for 31.5 GHz channel spacing, and optimized for 34.5 GHz channel spacing. Note, there is no constraint on symmetry, hence the side lobe behavior. The optimized filters are optimized for a certain system/channel. Thus the α is variable.

FIGS. 11, 12, and 13 show optimized pulse performance versus RRC pulses (with α at 0, 0.1, and 0.15) for different OSNR values, specifically OSNR=22 dB (FIG. 11), OSNR=16 dB (FIG. 12), and OSNR=12.5 dB (FIG. 13). FIG. 14 displays the optimized pulse bandwidth as a function of the channel spacing, compared to the bandwidth of the RRC pulse with a roll-off factor (α) of 0.1. It can be seen that in the super-Nyquist regime (channel spacing lower than 35 GHz), the optimized pulse bandwidth is narrower, causing less inter-channel interference, therefore explaining the better performance of the optimized pulse compared to the RRC pulse. Also, by maximizing the Q-factor, the optimization algorithm adjusts the time domain properties of the Tx and Rx optimized pulses resulting in a minimum amount of intersymbol interference.

FIGS. 15 and 16 are graphs of the resulting optical Tx spectral density under super-Nyquist conditions. Specifically, FIG. 15 shows two channels whereas FIG. 16 shows five channels. Two plots are shown, one using an RRC filter with α=0.1 and the optimized filter shape (at 31.5 GHz). FIG. 17 illustrates the corresponding Rx constellations from FIG. 15, with the optimized constellation shown relative to a constellation with the RRC filter with α=0.1.

Finally, FIG. 18 is a graph of Q improvement relative to OSNR for different channel spacing (31.5 GHz, 34.5 GHz, and 37.5 GHz). Note, 31.5 GHz channel spacing has approximately 60% improvement over 50 GHz channel spacing for spectral efficiency and capacity. With the optimization described herein, there is significant Q improvement at this super-Nyquist channel spacing. Table 1 provides a summary of the Q-factor enhancement provided by the optimized pulse over an RRC pulse with a roll-off factor of 0.1 for a channel spacing of 31.5, 34.5 and 37.5 GHz.

TABLE 2

| Q improvement over an RRC filter (α = 0.1) | | | |
| --- | --- | --- | --- |
| OSNR (dB) | Q Improvement (31.5 GHz) | Q Improvement (34.5 GHz) | Q Improvement (37.5 GHz) |
| 22.0 | 2.21 dBQ | 1.61 dBQ | 0.31 dBQ |
| 16.0 | 1.65 dBQ | 0.69 dBQ | 0.11 dBQ |
| 12.5 | 1.08 dBQ | 0.34 dBQ | 0.03 dBQ |

Variously, the optimization engine 20 can be configured to implement the processes 100, 150, receiving Q-factor measurements from the modems 30 and providing coefficient values to the filters 40, 42 which are part of the modems 30. The optimization engine 20 can be located in a node, network element, controller, element management system, etc. The optimization engine 20 can include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic. Of course, a combination of the approaches above may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optimization method configured to optimize filter coefficients in pulse shaping filters in transmitters and matched filters in receivers to maximize a Q-factor of a channel of one or more channels in a fiber optic system, the optimization method comprises:
   iteratively adjusting, via an optimization engine, filter coefficients of the pulse shaping filters at the transmitters and the matched filters at the receivers to maximize a measured Q-factor of the channel, wherein the optimization engine is in communication with the transmitters and the receivers to concurrently adjust the filter coefficients; and
   setting the filter coefficients of the pulse shaping filters and the matched filters to optimized values based on the iteratively adjusting.

2. The optimization method of claim 1, wherein the iteratively adjusting is performed while the fiber optic system is in-service.

3. The optimization method of claim 1, wherein the iteratively adjusting comprises:
   determining updated values for the filter coefficients;
   causing update of the filter coefficients to the updated values;
   receiving an updated measured Q-factor for the one or more channels based on the updated filter coefficients; and
   continuing the determining, the causing, and the receiving the updated measured Q until the filter coefficients are determined to represent the optimized values.

4. The optimization method of claim 3, wherein the optimized values are determined when one of Kuhn-Tucker conditions are met and a maximum number of iterations is reached.

5. The optimization method of claim 1, wherein the iteratively adjusting utilizes an objective function defined as maximize[min[$Q_1 Q_2 \ldots Q_N$]] wherein $Q_n$ is the measured Q-factor for channel n, and N is a number of channels.

6. The optimization method of claim 1, wherein the iteratively adjusting utilizes a Sequential Quadratic Programming (SQP) algorithm.

7. The optimization method of claim 1, wherein the one or more channels comprise at least two channels with super-Nyquist channel spacing between them.

8. An apparatus configured to optimize filter coefficients in pulse shaping filters in transmitters and matched filters in receivers to maximize a Q-factor of a channel of one or more channels in a fiber optic system, the apparatus comprises:
   a processor; and
   memory storing instructions that, when executed, cause the processor to implement an optimization engine configured to
      iteratively adjust filter coefficients of the pulse shaping filters at the transmitters and the matched filters at the receivers to maximize a measured Q-factor of the channel, wherein the optimization engine is in communication with the transmitters and the receivers to concurrently adjust the filter coefficients, and
      cause setting of the filter coefficients of the pulse shaping filters and the matched filters to optimized values based on the adjustment.

9. The apparatus of claim 8, wherein the filter coefficients are adjusted while the fiber optic system is in-service.

10. The apparatus of claim 8, wherein the iteratively adjust comprises the memory storing instructions that, when executed, further cause the processor to
    determine updated values for the filter coefficients,
    cause update of the filter coefficients to the updated values,
    receive an updated measured Q-factor for the one or more channels based on the updated filter coefficients, and
    continue the determine, the cause, and the receive the updated measured Q until the filter coefficients are determined to represent the optimized values.

11. The apparatus of claim 10, wherein the optimized values are determined when one of Kuhn-Tucker conditions are met and a maximum number of iterations is reached.

12. The apparatus of claim 8, wherein the apparatus utilizes an objective function defined as maximize[min[$Q_1 Q_2 \ldots Q_N$]] wherein $Q_n$ is the measured Q-factor for channel n, and N is a number of channels.

13. The apparatus of claim 8, wherein the apparatus utilizes a Sequential Quadratic Programming (SQP) algorithm.

14. The apparatus of claim 8, wherein the one or more channels comprise at least two channels with super-Nyquist channel spacing between them.

15. A fiber optic system, comprising:
   one or more transmitters each comprising a pulse shaping filter;
   one or more receivers each configured to communicate with a respective transmitter of the one or more receivers and each comprising a matched filter; and
   an optimization engine in communication with the one or more transmitters and the one or more receivers, wherein the optimization engine is configured to iteratively adjust filter coefficients of the pulse shaping filters at the transmitters and the matched filters at the receivers to maximize a measured Q-factor of a channel of one or more channels, wherein the optimization engine concurrently adjusts the filter coefficients at the transmitters and the receivers, and cause setting of the filter coefficients of the pulse shaping filters and the matched filters to optimized values based on the iterative adjustment.

16. The fiber optic system of claim 15, wherein the filter coefficients are adjusted while the fiber optic system is in-service.

17. The fiber optic system of claim 15, wherein, to perform the iteratively adjust, the optimization engine is configured to determine updated values for the filter coefficients, cause update of the filter coefficients to the updated values, receive an updated measured Q-factor for the one or more channels based on the updated filter coefficients, and continue the determine, the cause, and the receive the updated measured Q until the filter coefficients are determined to represent the optimized values.

18. The fiber optic system of claim 17, wherein the optimized values are determined when one of Kuhn-Tucker conditions are met and a maximum number of iterations is reached.

19. The fiber optic system of claim 15, wherein the optimization engine utilizes an objective function defined as maximize[min[$Q_1\ Q_2\ \ldots\ Q_N$]] wherein $Q_n$ is the measured Q-factor for channel n, and N is a number of channels.

20. The fiber optic system of claim 15, wherein the one or more channels comprise at least two channels with super-Nyquist channel spacing between them.

* * * * *